(12) United States Patent
Hunt et al.

(10) Patent No.: US 7,955,421 B2
(45) Date of Patent: Jun. 7, 2011

(54) DEGASSING METHOD AND APPARATUS FOR SEPARATING GAS FROM LIQUIDS AND POSSIBLY SOLIDS

(75) Inventors: Tyson Bradford Hunt, Saratoga Springs, NY (US); Jerry M. Floyd, Brunswick, GA (US)

(73) Assignee: Andritz Inc., Glens Falls, NY (US)

( * ) Notice: Subject to any disclaimer, the term of this patent is extended or adjusted under 35 U.S.C. 154(b) by 561 days.

(21) Appl. No.: 12/022,695

(22) Filed: Jan. 30, 2008

(65) Prior Publication Data
US 2009/0020480 A1 Jan. 22, 2009

Related U.S. Application Data

(60) Provisional application No. 60/950,239, filed on Jul. 17, 2007.

(51) Int. Cl.
*B01D 19/00* (2006.01)

(52) U.S. Cl. .............. 95/261; 96/209; 96/195; 96/187

(58) Field of Classification Search .......... 95/261, 95/260, 262; 96/209, 210, 211, 212, 213, 96/195, 187, 194, 197, 204
See application file for complete search history.

(56) References Cited

U.S. PATENT DOCUMENTS

| | | | | |
|---|---|---|---|---|
| 2,762,451 A * | 9/1956 | McNeil | .......... | 96/212 |
| 2,816,490 A * | 12/1957 | Boadway et al. | ......... | 96/195 |
| 3,163,508 A * | 12/1964 | Tuck et al. | .......... | 95/242 |
| 3,303,895 A * | 2/1967 | Fontenot | .......... | 175/66 |
| 3,421,622 A * | 1/1969 | Wurtmann | .......... | 209/731 |
| 4,097,358 A * | 6/1978 | Wiseman | .......... | 204/270 |
| 4,363,641 A * | 12/1982 | Finn, III | .......... | 96/156 |
| 6,821,322 B2 * | 11/2004 | Milia | .......... | 96/209 |
| 2007/0163442 A1 * | 7/2007 | Saito et al. | .......... | 96/209 |

* cited by examiner

*Primary Examiner* — Duane Smith
*Assistant Examiner* — Douglas J Theisen
(74) *Attorney, Agent, or Firm* — Nixon & Vanderhye P.C.

(57) ABSTRACT

A degasser having a flapper opening including a hinge. The hinge may permit purging of any liquids and solids without regular human intervention. There may be a fixed opening at the base of the degasser, such that there is a constant emptying from the bottom of the tank. The separation of gas from liquid may be involved in applications pertaining to pulping and oxygen delignification.

20 Claims, 2 Drawing Sheets

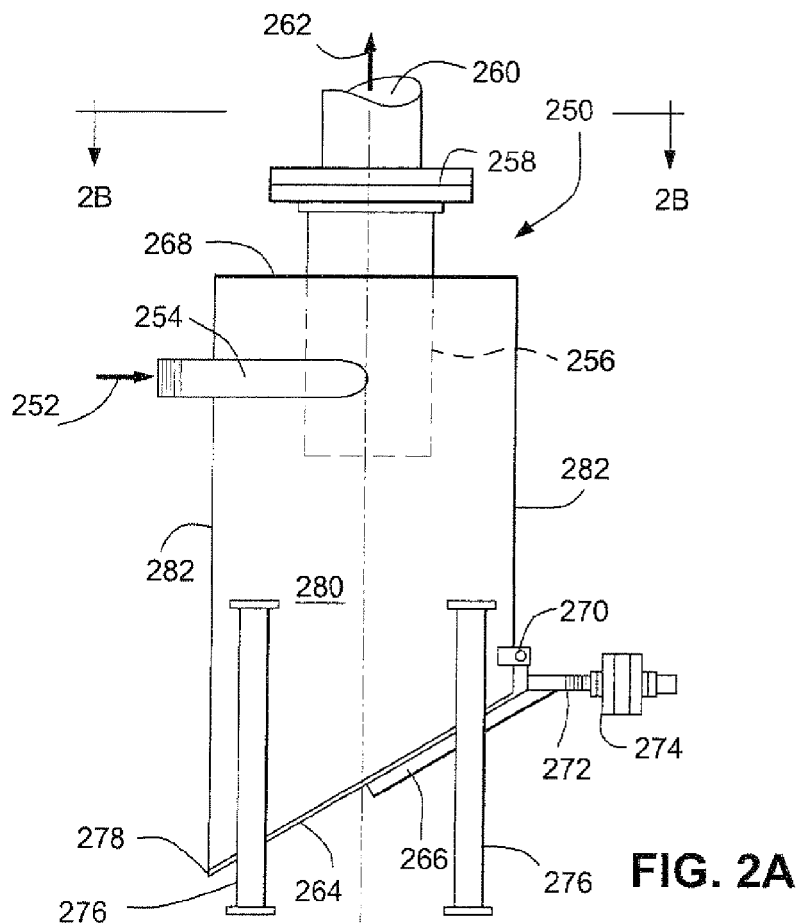
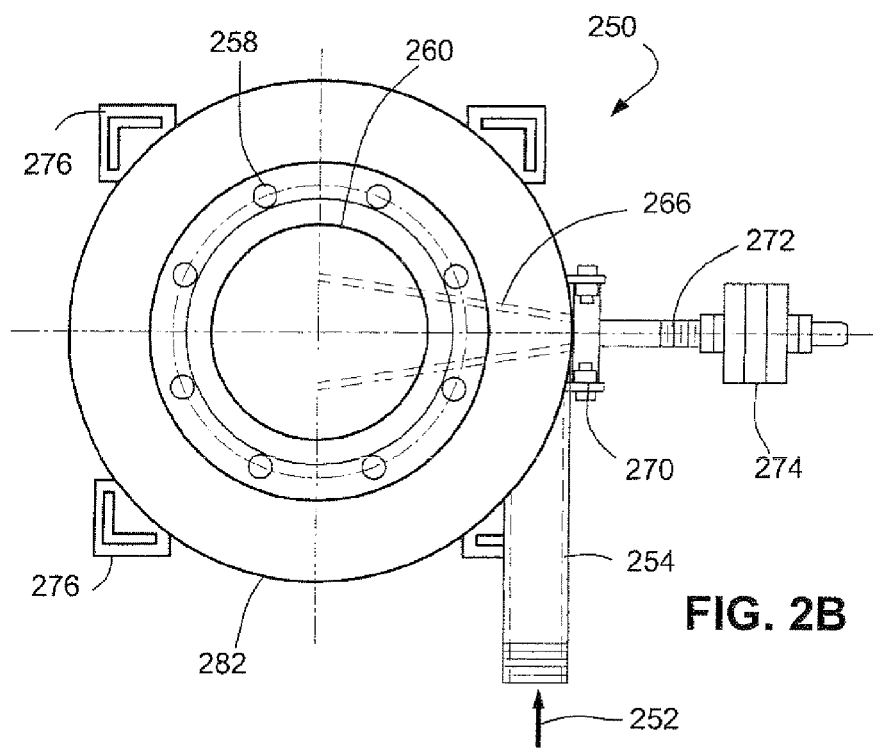

DEGASSING METHOD AND APPARATUS FOR SEPARATING GAS FROM LIQUIDS AND POSSIBLY SOLIDS

RELATED APPLICATION

This application claims the benefit of U.S. Patent Application Ser. No. 60/950,239, filed Jul. 17, 2007, which is incorporated by reference in its entirety.

BACKGROUND AND SUMMARY OF THE INVENTION

The present invention generally relates to the separation of gas from liquid, particularly with respect to applications pertaining to pulping and oxygen delignification.

Degassing unit operations are known. For example, a conventional degasser is illustrated in FIGS. 1A and 1B. FIG. 1B shows a cross-sectional view (1B-1B) of the process shown in FIG. 1A, and like items are identified with like numerals. The system 100 includes input stream 104, and output streams 124 and 136. Input stream 104 may include liquids and gasses. The liquids may comprise primarily water, and the gasses may include process waste gasses, such as carbon dioxide, carbon monoxide, oxygen, methane, etc. The system 100 separates these gases, which may exit primarily via output stream 124.

In FIGS. 1A and 1B, input stream 104 flows through conduit 110 to pump 112, which is connected to shaft 114 and motor 116. As shaft 114 rotates, the liquid-gas mixture is pumped through conduit 118 to the degasser 102. Conduits 110 and 118 may be flexible hoses. As illustrated, conduit 118 is connected to inlet pipe 120. Inlet pipe 120 is connected to a pipe 122 at the top of degasser 102. As the liquid-gas mixture enters the pipe 122, the liquids tend to fall, while the gasses tend to rise and exit out of the top of the degasser 102 through output stream 124 to a gas collector (not shown).

As shown by the arrows at the base of pipe 122, the liquid flows up the approximately cylindrical tank defined by base 128 and walls 126. The liquid exits through conduit 134 to output stream 136, which is sent to liquid waste.

At the base of the tank, there is a flushing connection 130. As solids (e.g., pulp, etc.) accumulate at the base of the degasser, there is a potential for clogging. Those solids are generally manually removed periodically using the flushing connection 130. As illustrated base 128 is roughly parallel with the ground, such that the walls 126 intersect base 128 perpendicularly.

For applications involving low amounts of solids in the liquid-gas stream, the prior art may be suitable. That is, the periodic, manual cleaning may work well because a low-solids content will generally require a relatively long period of time before cleaning becomes necessary.

But in applications having a larger (or non-insignificant) amount of solids (such as pulp, etc.) in the liquid-gas stream to be separated into gas and liquid, there may be a need for a degasser that does not clog, is easy to clean or purge (or automatically cleaning), and disposes of waste.

In one aspect, certain embodiments of the present invention generally relate to a degasser having a flapper opening including a hinge and a counterweight. The hinge and counterweight may permit purging of any liquids and solids without regular human intervention. In other embodiments, there is a fixed opening at the base of the degasser, such that there is a constant emptying from the bottom of the tank.

In another aspect, certain embodiments of the present invention generally relate to an inlet design that facilitates separation of any solids (e.g., pulp, etc.) by reducing the velocity of the inlet stream on entry into the degasser. For example, this may be done using a flange. Facilitating the separation of solids may prevent clogging.

In one respect, certain embodiments of the present invention generally relate to a degasser for separating gas from liquid comprising: a substantially cylindrical tank comprising a top, a bottom, and a circumferential side wall; an inlet pipe for carrying a stream comprising a mixture of gas and liquid; and a vent pipe connected to the tank, wherein the vent pipe receives separated gas; wherein the bottom of the tank is connected to the circumferential side wall by a hinge such that the hinge at least partially opens when a sufficient mass of liquid weighs down on the bottom of the tank and at least partially closes when an insufficient mass of liquid weighs down on the bottom of the tank; and wherein the separated liquid exits the tank via an opening created as the hinge opens and creates a gap between the bottom of the tank and the circumferential side wall.

In one respect, certain embodiments of the present invention generally relate to a method of separating gas from liquid, the method comprising the steps of feeding a mixture of gas and liquid to a substantially cylindrical tank comprising a top, a bottom, and a circumferential side wall, wherein the bottom of the tank is connected to the circumferential side wall by a hinge that opens when a sufficient mass of liquid weighs down on the bottom of the tank and closes when an insufficient mass of liquid weighs down on the bottom of the tank; removing gas from the tank using a vent pipe attached to the top of the tank; and removing liquid from the tank using an opening created as the hinge opens and creates a gap between the bottom of the tank and the circumferential side wall.

BRIEF DESCRIPTION OF THE DRAWINGS

FIGS. 2A and 2B illustrate a degasser according to an embodiment of the present invention.

DETAILED DESCRIPTION OF THE INVENTION

The present invention generally relates to a system for separating gasses (such as carbon dioxide, carbon monoxide, oxygen, methane, etc.) from a process stream including liquids and possibly solids. The liquid may comprise primarily water. In a preferred embodiment, the present invention has particular utility in a process for oxygen delignification in pulping and paper making. For example, the present invention may be used in conjunction with a stock pump between pressurized stages, e.g., in a system utilizing low pressure steam.

FIGS. 2A and 2B illustrate a preferred embodiment of the present invention, namely degasser 250. FIG. 2B shows a cross-sectional view (2B-2B) of the process shown in FIG. 2A, and like items are identified with like numerals. The liquid-gas stream 252 (which may contain solids, such as pulp, stock, etc.) enters via inlet pipe 254.

Figure 1A:
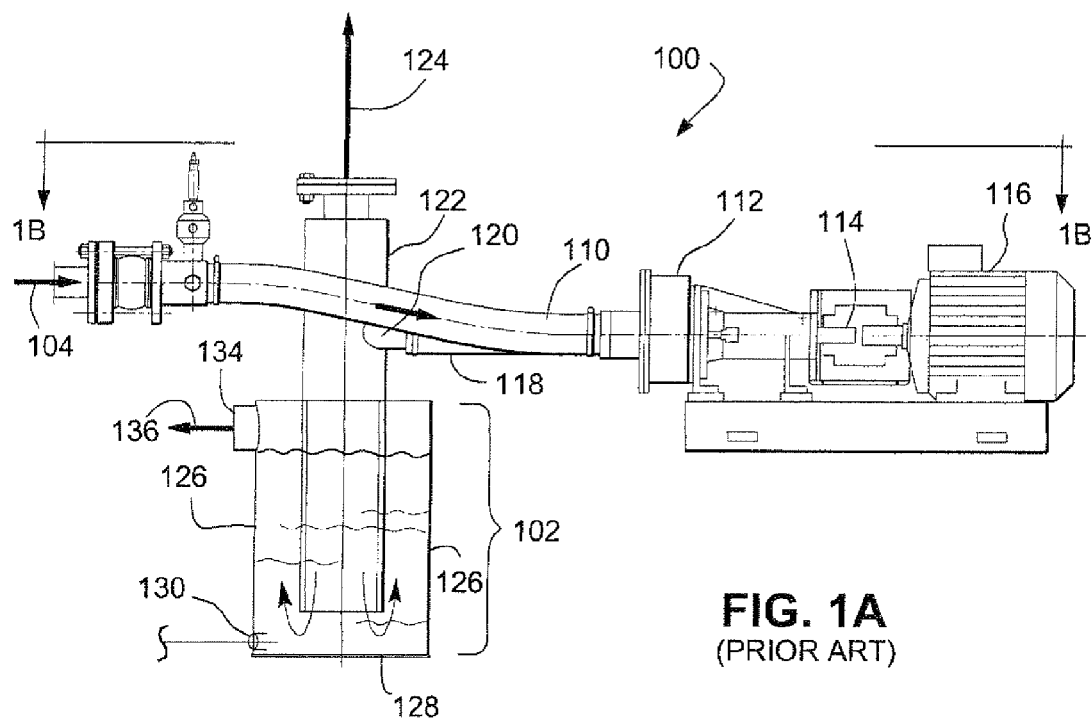
FIGS. 1A and 1B illustrate a prior art system including a degasser.
Figure 1B:
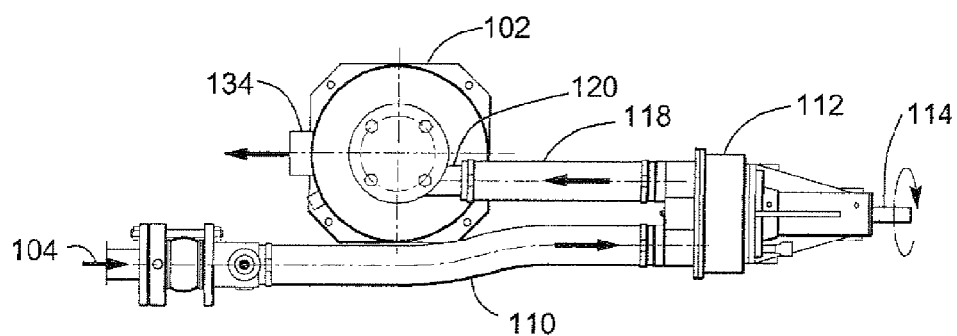

As compared to some prior art processes (such as the one described in FIGS. 1A and 1B), the inlet pipe enters at a greater radius, so as to discourage clogging of the pipe 256. Indeed, stream 252, inlet pipe 254, and pipe 256 are preferably designed to decrease the velocity of the stream 252 and/or designed to discourage clogging of pipe 256 with solids (if present). Baffles, flanges, etc. may also be present in preferred embodiments.

As illustrated in FIGS. 2A and 2B, gasses exit via stream 262 through vent pipe 260, which is connected to pipe 256 via vent connector 258. Vent pipe 260 may be attached to a vacuum (e.g., 4 to 6 inches H$_2$O) to facilitate separation and evacuation of the gasses. Liquids and solids (if present) generally are pulled via gravity downwards into tank 280.

Tank 280 may be generally defined by top 268, circumferential side 282, and bottom 264. Tank 280 may be generally cylindrical; as illustrated, however, bottom 264 need not be parallel with top 268. As illustrated, side 282 may have differing lengths along the periphery of the tank, and an angle at corner 278 (at the intersection of side 282 and bottom 264) may be greater than 0° and less than 90°. The stock, however, need not gather or collect in all embodiments. In a preferred embodiment, the angle at corner 278 may be approximately 45° (as illustrated in FIG. 2A). Such an angle facilitates the collection of solids in a manner that facilitates operation of the flapper (described below).

In other embodiments, bottom 264 has a non-planar shape. For example, it may be curvilinear or parabolic when viewed from a side cross-section. These non-planar shapes may also facilitate the collection or gathering of solids.

As illustrated in FIGS. 2A and 2B, hinge 270 attaches wall 282 to bottom 264. Bottom 264 may be reinforced with a stiffening back 266 to inhibit or prevent warpage and possibly increase durability. Rod 272 supports movable counterweight 274, such that the bottom 264 opens when the force pushing on the bottom 264 (e.g., from the accumulating mass of liquid and solids (if present)) exceeds the balancing force on the other side of the hinge 270 (including, e.g., counterweight 274 and rod 272). Other conventional methods (e.g., springs, etc.) may be used to provide an upward force on bottom 264 opposing the downward force of liquids and solids.

Depending on the application—including, for example, the solids content and make-up—the counterweight may be moved to permit opening of the flapper and hinge using more or less force. In some applications, the amount of force will also be affected by the strength of the vacuum being pulled through stream 262 and vent pipe 260. For example, a stronger vacuum may decrease the force applied on the bottom 264, e.g., by the accumulating mass of liquid and solids in tank 280.

Preferably, degasser 250 and tank 280 are located over a drain (e.g., through support by legs 276), such as a U-drain already existing in the facility. This would allow the hinge to open and the liquid and solids (if present) to exit to a preexisting waste stream. In other embodiments, the solids and liquids exiting tank are collected and recycled for further processing without immediate introduction into a waste stream.

As illustrated, the connection (e.g., seal) between the bottom 264 and the rest of tank 280 is generally friction based. In some embodiments, it may be preferably to prevent a completely contacting seal from forming. That is, in some embodiments, the hinge 270 may be prevented from shutting. This may be accomplished, for example, with an adjustable nut and bolt mechanism that holds the flapper open by a fraction of an inch, an inch, or more. In such embodiments, the liquid is continuously draining out the bottom of tank 280 during the degassing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A degasser for separating gas from liquid comprising:
   a substantially cylindrical tank comprising a top, a bottom, and a circumferential side wall;
   an inlet pipe for carrying a stream comprising a mixture of gas and liquid; and
   a vent pipe connected to the tank, wherein the vent pipe receives separated gas;
   wherein the bottom of the tank is connected to the circumferential side wall by a hinge such that the hinge at least partially opens when a sufficient mass of liquid weighs down on the bottom of the tank and at least partially closes when an insufficient mass of liquid weighs down on the bottom of the tank; and
   wherein the separated liquid exits the tank via an opening created as the hinge opens and creates a gap between the bottom of the tank and the circumferential side wall.

2. The degasser of claim 1, wherein the hinge is configured to at least partially open when a sufficient mass of liquid and solids weighs down on the bottom of the tank and at least partially closes when an insufficient mass of liquid and solids weighs down on the bottom of the tank bottom.

3. The degasser of claim 2, wherein the solids automatically exit the tank via the opening created as the hinge opens without human intervention.

4. The degasser of claim 2, wherein solids comprising wood pulp weighing down on the bottom of the tank partially opens the hinge.

5. The degasser of claim 1, wherein an angle defined at the intersection of the bottom of the tank and a portion of the circumferential side opposite the hinge is connected to the bottom of the tank measures greater than 0 degrees and less than 90 degrees.

6. The degasser of claim 1, wherein the circumferential side has a nonuniform length.

7. The degasser of claim 1, wherein the bottom further comprises a stiffening back to inhibit an occurrence of warpage.

8. The degasser of claim 1, wherein the hinge comprises a rod and a movable counterweight to provide an upward force on the bottom of the tank that opposes the force of the liquid weighing down on the bottom of the tank.

9. The degasser of claim 1, wherein the hinge comprises a spring to provide an upward force on the bottom of the tank that opposes the force of the liquid weighing down on the bottom of the tank.

10. The degasser of claim 1, wherein the bottom comprises a non-planar shape.

11. The degasser of claim 1, wherein the bottom comprises a curvilinear or parabolic shape.

12. The degasser of claim 1, wherein the bottom is prevented from closing and wherein the opening created by the gap between the bottom of the tank and the circumferential side wall never closes.

13. A method of separating gas from liquid, the method comprising the steps of:
    feeding a mixture of gas and liquid to a substantially cylindrical tank comprising a top, a bottom, and a circumferential side wall, wherein the bottom of the tank is connected to the circumferential side wall by a hinge that opens when a sufficient mass of liquid weighs down on the bottom of the tank and closes when an insufficient mass of liquid weighs down on the bottom of the tank;
    removing gas from the tank using a vent pipe attached to the top of the tank; and removing liquid from the tank using an opening created as the hinge opens and creates a gap between the bottom of the tank and the circumferential side wall.

14. The method of claim 13, wherein the mixture of gas and liquid further comprises solids comprising wood pulp.

15. The method of claim 14, wherein the step of feeding the mixture of gas, liquid, and wood pulp comprises reducing a velocity of the mixture to facilitate the separation of solids from the gas.

16. The method of claim 15, wherein reducing the velocity comprises contacting the mixture with a baffle or flange positioned within an inlet pipe.

17. The method of claim 13, wherein the step of removing gas further comprises a vacuum attached to the vent pipe to facilitate separation and evacuation of the gas from the tank.

18. The method of claim 13, wherein the hinge comprises a rod and a movable counterweight to provide an upward force on the bottom of the tank that opposes the force of the liquid weighing down on the bottom of the tank.

19. The method of claim 13, wherein the hinge comprises a spring to provide an upward force on the bottom of the tank that opposes the force of the liquid weighing down on the bottom of the tank.

20. The method of claim 13, wherein the step of removing liquid from the tank uses a permanent opening, and wherein the opening created by the gap between the bottom of the tank and the circumferential side wall never closes.

* * * * *